(12) United States Patent
Hama

(10) Patent No.: US 6,980,835 B2
(45) Date of Patent: Dec. 27, 2005

(54) FOLDING MOBILE COMMUNICATION DEVICE HAVING SIMPLIFIED CALL INITIATION OPERATION

(75) Inventor: Mitsuji Hama, Higashiosaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 571 days.

(21) Appl. No.: 09/972,255

(22) Filed: Oct. 5, 2001

(65) Prior Publication Data

US 2002/0045467 A1 Apr. 18, 2002

(30) Foreign Application Priority Data

Oct. 18, 2000 (JP) ............................. 2000-318091

(51) Int. Cl.[7] ........................... H04M 1/00; H04M 3/00
(52) U.S. Cl. ................. 455/567; 455/564; 455/575.3; 379/355.01; 379/433.06
(58) Field of Search ............................... 455/564, 566, 455/567, 575.3; 379/352, 354, 355.02, 355.03, 379/355.09, 356.01, 357.05

(56) References Cited

U.S. PATENT DOCUMENTS

| | | | |
|---|---|---|---|
| 5,493,604 A | * | 2/1996 | Hirayama .................. 455/564 |
| 5,668,867 A | * | 9/1997 | Nagai ..................... 379/433.13 |
| 5,933,783 A | * | 8/1999 | Kawakami et al. ......... 455/566 |
| 5,953,413 A | * | 9/1999 | Peyer et al. ........... 379/433.06 |
| 6,052,579 A | * | 4/2000 | McC Estabrook .......... 455/418 |
| 6,349,220 B1 | * | 2/2002 | Prior et al. ................. 455/566 |
| 6,434,370 B1 | * | 8/2002 | Kodera et al. ............. 455/90.1 |
| 6,438,388 B1 | * | 8/2002 | McC Estabrook ....... 455/550.1 |

FOREIGN PATENT DOCUMENTS

| | | |
|---|---|---|
| JP | 6-326658 | 11/1994 |
| JP | 2002-009927 | 11/2002 |

* cited by examiner

*Primary Examiner*—Binh K. Tieu

(57) ABSTRACT

A folding mobile communication device has a storage unit for storing at least one piece of call-destination information, each piece of call-destination information specifying a possible destination of a telephone call; a first display unit for displaying one piece of call-destination information in a position on a main body of the communication device that is exposed when the main body is in a folded state; and a call initiation unit for initiating, following the main body being put into an unfolded state, a telephone call to the destination specified by the piece of call-destination information being displayed.

5 Claims, 8 Drawing Sheets

| 301 ↓ | 302 ↓ | 303 ↓ | 300 |
|---|---|---|---|
| NUMBER | NAME | TELEPHONE NUMBER | |
| 001 | TARO SUZUKI | 090-□×○×-○××○ | |
| 002 | JIRO SUZUKI | 090-□△×○-○△△○ | |
| 003 | SABURO SUZUKI | 090-□×△△-△△×× | |
| ⋮ | ⋮ | ⋮ | |
| 998 | — | 090-○△□×-○○○○ | |
| 999 | — | 090-△××△-○○□□ | | fig.3

FOLDING MOBILE COMMUNICATION DEVICE HAVING SIMPLIFIED CALL INITIATION OPERATION

BACKGROUND OF THE INVENTION (1) Field of the Invention

The present invention relates to a folding or open/close-type mobile communication device, and in particular a control technique for call initiation.

(2) Description of the Background Art

In recent years mobile communication devices which are used in systems such as PHS (Personal Handyphone System), PDC (Personal Digital Cellular telecommunication system), and CDMA (Code Division Multiple Access) have become common because of decreases in their size and weight, improvement in their communication quality, and reduction of the price of the devices themselves and of call charges. Currently, such devices are enjoying great popularity amongst young people.

In particular, amongst the numerous types of mobile communication devices, folding devices and open/close-type devices which are fashionable and allow for easy operation are popular, resulting in a trend of manufacturers competing against each other to sell such devices. Here, a folding device denotes a mobile communication device whose housing can be folded and unfolded, while an open/close-type device denotes a mobile communication device such as one having a lid which covers a main body of the communication terminal, the lid opening and closing by sliding, or by pivoting on a hinge to which the lid is attached.

When a user of a mobile communication device such as a folding or such an open/close-type terminal wishes to call a friend or a colleague for example, the user must first unfold (open) the main body from a folded (closed) state, have an initial screen which assists with user operations displayed on an LCD (Liquid Crystal Display) or the like, locate a button for having a telephone directory in which names and telephone numbers are registered in advance displayed, and then push the button to have the telephone directory displayed.

In addition, the user must perform button operations in order to flip through the pages of the telephone directory until the user finds the party whom they wish to call. When that party is found, the user moves the cursor to the place where the party is displayed, and presses the call start button.

As a result, a process to call the party is executed.

Of course the user can input the telephone number directly, after unfolding (opening) the communication device from the folded (closed) state, and then initiate the call by pressing the call start button. However, a limit to the number of telephone numbers a user can remember, and a fear of making a mistake when inputting a telephone number mean that most users normally use the telephone directory to initiate a call.

This kind of telephone directory is extremely useful to users.

However, there is a problem that having to operate the numerous buttons to find the party who is to be called and initiate the call, as explained above, is cumbersome.

SUMMARY OF THE INVENTION

In view of the stated problem, the first object of the present invention is to provide a folding mobile communication device with which a telephone call can be initiated without cumbersome operations by the user.

In addition, a second objective of the present invention is to provide a call-initiation method with which a telephone call can be initiated without cumbersome operations by the user for use with the stated folding mobile communication device. Furthermore, a third object of the present invention is to provide a program for initiating a telephone call without cumbersome operations by the user for use in the aforementioned folding mobile communication device.

Moreover, a fourth object of the present invention is to provide an open/close-type mobile communication device similar to the stated folding mobile communication device having a lid which covers a main body of the communication device, the lid opening and closing by sliding, or by pivoting on a hinge to which the lid is attached and with which a telephone call can be initiated without cumbersome operations by the user.

In order achieve the first object, the present invention is a folding mobile communication device, including a storage unit for storing at least one piece of call-destination information, each piece of call-destination information specifying a possible destination of a telephone call; a first display unit for displaying one piece of call-destination information in a position on a main body of the communication device that is exposed when the main body is in a folded state; and a call initiation unit for initiating, following the main body being put into an unfolded state, a telephone call to the destination specified by the piece of call-destination information being displayed.

According to the stated construction, a telephone call is made to the destination specified by the call-destination information by unfolding the device. Therefore, a telephone call can be made without cumbersome operations by the user.

Furthermore, the storage unit may store a plurality of pieces of call-destination information, and the communication device may further include a replacement instruction reception unit for receiving an instruction from the user to replace the piece of call-destination information being displayed, and the first display unit may display one of the plurality of pieces of call-destination information in the position, and replaces the piece of call-destination information being displayed with another of the plurality of pieces of call-destination information each time the instruction is received by the replacement instruction reception unit.

According to stated construction, different call-destination information is displayed in the position according to replacement instructions by the user. Therefore, the user can refer to more pieces of call-destination information.

Furthermore, the call-destination information may be a name with which a telephone number is corresponded, the first display unit may display the name in the position, and the call initiation unit may initiate the telephone call based on the telephone number which is corresponded with the name being displayed in the position.

According to the stated construction, a party to whom a telephone call is to be initiated can be specified easily because the name of the party is displayed on the first display unit.

Furthermore, the folding mobile communication device may further include a second display unit for, following an operation being performed to unfold the main body, displaying the name which is being displayed in the position in another position which is exposed when the main body is put into the unfolded state.

According to the stated construction, the name of a party to whom a telephone call was made can be confirmed after the main body has been unfolded, in other words, after the telephone call has been initiated.

Furthermore, the second display unit may, when displaying the name in the other position, display the name together with the telephone number which is in correspondence therewith.

According to the stated construction, the name and the telephone number of a party to whom a telephone call was made can be confirmed after the main body has been unfolded, in other words, after the telephone call has been initiated.

Furthermore, the storage unit may store the names in correspondence with one of (a) alphabetical order, (b) syllabary order and (c) an order of a system employed in ordering a language, and the first display unit may replace the names based on the order.

According to the stated construction, the user can predict the order in which the names will be displayed, therefore reducing the possibility of the user missing the name for which he/she is searching.

Furthermore, the folding mobile communication device may further include a receiving unit for receiving an input of a piece of call-destination information from the user, wherein the pieces of call-destination information stored in the storage unit have been received by the receiving unit prior to being stored.

According to the stated construction, the user registers the name and telephone number of a party to whom a telephone call may be made.

Furthermore, the communication terminal may further include a detection unit for detecting, immediate to the main body starting to be put into the unfolded state, that the main body has been put into the unfolded state, wherein the call initiation unit initiates a call following the detection unit detecting that the main body has been put into the unfolded state.

According to the stated construction, the telephone call is initiated when the user starts to unfold the communication terminal, therefore a telephone call can be established relatively quickly even if the communication terminal is unfolded slowly.

Furthermore, the storage unit may store a plurality of pieces of call-destination information and the communication device may further include a call amount correspondence unit for corresponding, for each destination, an amount of times that a call has been initiated to the destination based on a corresponding piece of the call-destination information, with the corresponding call-destination information in the storage unit, wherein the first display unit replaces so that names are displayed with priority in descending order of the amount of times that a telephone call has been initiated to the destination that corresponds to the name.

According to the stated construction, the more frequently telephone calls are made to a call destination, the higher the priority given the relative call-destination information in display. Therefore, the user can search the call-destination information more effectively for the party to whom a telephone call is to be made.

Furthermore, the call-destination information maybe a telephone number, the first display unit may display the telephone number in the exposed position, and the call initiation unit may initiate the telephone call based on the telephone number being displayed in the position.

According to the stated construction, a telephone number is displayed on the first display unit, therefore as long as the user is able to specify the party to whom the telephone number belongs by recognizing the telephone number, a telephone call can be made without cumbersome operations.

Furthermore, the folding mobile communication device may further include a second display unit for, following an operation being performed to unfold the main body, displaying the name which is being displayed in the exposed position in another position which is exposed when the main body is put into the unfolded state.

According to the stated construction, a telephone number to which a telephone call has been made can be confirmed after the main body has been unfolded, in other words, after the telephone call has been initiated.

Furthermore, the folding mobile communication device further includes a telephone number obtaining unit for obtaining a telephone number which is transmitted together with an incoming-call, and storing the obtained telephone number in the storage unit.

According to the stated construction, a telephone number which is transmitted with an incoming-call is stored in the storage unit without the user inputting the telephone number, therefore the user is saved the trouble of inputting the telephone number.

Furthermore, the storage unit may store a plurality of telephone numbers, and the communication device may further include an incoming-call time corresponding unit for corresponding a time of reception of the incoming-call with the obtained telephone number, wherein the first display unit replaces so that call-destination information is displayed with priority given in order of lateness of time of reception.

According to the stated construction, the later the time a telephone call is received, the higher the priority the telephone number of the caller is given in being displayed in the position.

In other words when a telephone call is received, the telephone number is displayed in the position immediately. Therefore, the burden on the user when calling-back the caller is reduced.

Furthermore, the folding mobile communication device may further include a receiving unit for receiving an input of a piece of call-destination information from the user, wherein the pieces of call-destination information stored in the storage unit have been received by the receiving unit prior to being stored.

According to the stated construction, the telephone number of a party who may be called is input by the user.

Furthermore, the folding mobile communication device may further include a call amount correspondence unit for corresponding, for each destination, an amount of times that a telephone call has been initiated to the destination based on a corresponding piece of call-destination information, with the corresponding piece of call-destination information in the storage unit, wherein the first display unit replaces so that telephone numbers are displayed with priority given in descending order of amount of times that a telephone call has been made to the corresponding call destination.

According to the stated construction, a telephone number whose corresponded amount of times a telephone call is initiated is great is displayed with priority. Therefore the user can search the telephone numbers more effectively.

Furthermore, the folding mobile communication device may further include a second display unit for, following an operation being performed to unfold the main body, displaying the call-destination information which is being displayed in the position in another position which is exposed when the main body is put into the unfolded state.

According to the stated construction, a name to which a telephone call has been made can be confirmed after the main body has been unfolded, in other words, after the telephone call has been initiated.

Furthermore, the folding mobile communication device may further include a receiving unit for receiving an input of a piece of call-destination information from the user, wherein the pieces of call-destination information stored in the storage unit have been received by the receiving unit prior to being stored.

According to the stated construction, the name and telephone number of a party who may be called are input by the user.

Furthermore, the folding mobile communication device may further include a detection unit for detecting, immediate to the main body starting to be put into the unfolded state, that the main body has been put into the unfolded state, wherein the call initiation unit initiates a call following the detection unit detecting that the main body has been put into the unfolded state.

According to the stated construction, the telephone call is initiated when the user starts to unfold the device, therefore a telephone call can be established relatively quickly even if the communication device is unfolded slowly.

Furthermore, in order to achieve the second object, a call initiating method of the present invention may be a calling method for making a call, for use in a folding mobile communication device which has storage unit for storing at least one piece of call-destination information, each piece of call information specifying a possible destination of a telephone call, the method including: a display step for displaying one piece of call-destination information in a position on a main body of the communication device that is exposed when the main body is in a folded state; and a call initiation step for initiating, following the main body being put into an unfolded state, a telephone call to the call destination specified by the piece of call-destination information being displayed.

According to the stated method, in a folding communication terminal a telephone call is made to the destination specified by the call-destination information by unfolding the communication device. Therefore, a telephone call can be made without cumbersome operations by the user.

Furthermore, in order to achieve the third object, a computer-readable recording medium of the present invention on which is recorded a program used for initiating a call in a folding mobile communication device which has storage unit for storing at least one piece of call-destination information, each piece of call destination information specifying a possible destination of a telephone call, the program executing: a display step for displaying one of the pieces of call-destination information in a position on a main body of the communication device that is exposed when the main body is in a folded state; a call initiation step for initiating, following the main body being put into an unfolded state, a telephone call to the call destination specified by the displayed piece of call-destination information.

According to the stated method, in a open/close-type mobile communication device a telephone call is made to the call-destination specified by the call-destination information by opening the device. Therefore, a telephone call can be made without cumbersome operations by the user.

Furthermore, in order to achieve the fourth object an open/close-type mobile communication device has a lid which covers a main body of the communication device, the lid opening and closing by (a) sliding, or (b) pivoting on a hinge to which the lid is attached, including: a storage unit for storing at least one piece of call-destination information, each piece of call-destination information specifying a possible destination of a telephone call; a first display unit for displaying one piece of call-destination information in a position on the main body that is exposed when the lid is in a closed state; and a call initiation unit for initiating, following the lid being put into an open state, a telephone call to the call destination specified by the piece of call-destination information being displayed.

According to the stated construction, a telephone call is made to the destination specified by the call-destination information by opening the device. Therefore, a telephone call can be made without cumbersome operations by the user.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 3 shows the data structure of a table showing a telephone directory in which numbers, names, and telephone numbers are corresponded;

DESCRIPTION OF THE PREFERRED EMBODIMENTS

The following describes an folding mobile communication device 100 of an embodiment of the present invention, with reference to the drawings.

<Structure>

Figure 1:
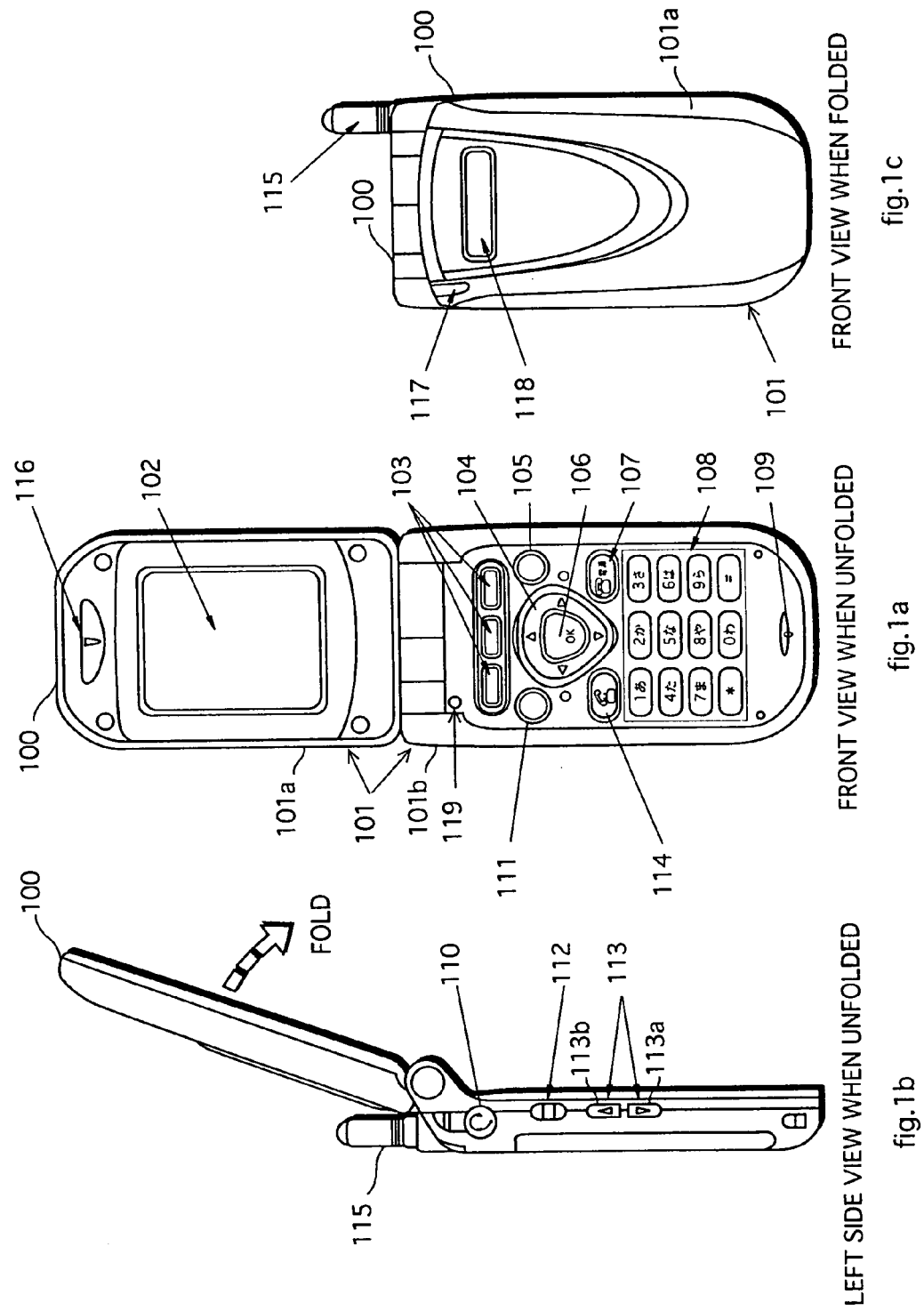
FIG. 1a is a front view of the folding mobile communication device of the present invention.
FIG. 1b is a side view of the folding mobile communication device of the present invention when in an unfolded state.
FIG. 1c is a front view of the folding mobile communication device of the present invention when in a folded state.

FIG. 1 shows outer views of the folding mobile communication device (hereinafter "communication device") 100 of the present invention.

The communication device 100 is an IS (Interim Standard)-95 CDMA (Code Division Multiple Access) folding mobile telephone of which FIG. 1a shows a front view when unfolded, FIG. 1b shows a left side view when open, and FIG. 1c shows a front view when folded.

Visible parts of the communication device 100 are housing 101, a main display 102, flexible keys 103, a 4-position key 104, an e-mail key 105, a menu/OK key 106, an end/power key 107, a numeric key pad 108, a microphone 109, an earphone terminal cover 110, a web key 111, a side OK key 112, side scroll keys 113, a start key 114, an antenna 115, a speaker 116, an incoming-communication lamp 117, a sub-display 118, and a detection switch 119.

The housing 101 is foldable housing made of resin and so on and has a hinge in the center. The housing unit 101 is composed of top housing 101a and bottom housing 101b.

The main display 102 and the speaker 116 are on the inner face of the top housing 101a, while the incoming-call lamp 117 and the sub-display 118 are on the outer face of the top housing 101a.

Here the inner face refers to the face of the housing unit 101 that cannot be seen when the communication device is completely closed.

The earphone terminal cover 110, the side OK key 112, and the side scroll keys 113 are on the left side of the lower housing 101b.

The flexible key 103, the 4-position key 104, the e-mail key 105, the menu/OK key 106, the end/power key 107, the numeric key pad 108, the microphone 109, the web key 111, the start key 114, and the detection switch 119 are on the front inner face of the bottom housing 101b.

The main display 102 is a color LCD (Liquid Crystal Display) which can display approximately 100 characters without scrolling.

The flexible keys 103 are three switches which are for selecting display items on the main display 102 which correspond respectively to the positions in which the switches are placed.

The 4-position key 104 moves up, down, left, and right to move the cursor and scroll items displayed on the main display 102.

The e-mail key 105 is a pushbutton switch for having an electronic mail function screen displayed.

The menu/OK key 106 is a pushbutton switch for proceeding to items in the menu and confirming selected items.

The end/power key 107 is a pushbutton switch for turning the power to the communication device on and off, and for ending calls.

The numeric key pad 108 is a group of 12 pushbutton switches, each of which corresponds to a number and/or one or more characters. These pushbutton switches are for inputting characters for telephone numbers, e-mail, and so on.

The microphone 109 converts input voices into electric signals (hereinafter "voice signal(s)"), and outputs the voice signals to a voice processing unit 124 which will be explained later.

The earphone terminal cover 110 protects an earphone device (not illustrated).

The web key 111 is a pushbutton switch for proceeding to a display screen for an Internet connection function.

The side OK key 112 is a sliding switch for memo reproduction, voice recording, and confirming a selected item.

The side scroll keys 113 are two buttons: a scroll-down key 113a and a scroll-up key 113b. The side scroll keys 113 is for scrolling a displayed page up and down.

The start key 114 is a button switch for starting communication when a call is made or received.

The antenna 115 is a whip antenna for tuning to transmission and reception radio waves.

The speaker 116 is made up of a piezoelectric device and so on, and performs electric-acoustic conversion of received signals and outputs caller's voices, and a ringer tone to inform the user of incoming-calls.

The incoming-communication lamp 117 is an LED (light-emitting diode) for notifying the user visually of incoming-communication. The incoming-communication lamp 117 blinks green when there is incoming-communication, and red during recharging of the communication device 100.

The sub-display 118 is made up of a black and white LED display apparatus and so on, and displays a maximum of approximately 10 characters. The sub-display 118, according to instructions from the control unit 120, displays a stand-by screen which shows the present time and the electric field strength, and displays information in which a name and a telephone number are registered in correspondence in a telephone directory. This information is referred to hereinafter as "registered information". The telephone directory will be explained later.

The detection switch 119 is a micro switch that detects mechanically whether the communication device 100 is folded or unfolded, and outputs a shut signal to the control unit 120 to inform the communication device 100 is in the folded state.

Here, the unfolded state denotes that the top housing 101a is in a state in which it does not contact a contact point with the aforementioned micro switch which is positioned on the bottom housing 101b. The output of the aforementioned shut signal ceases when the top housing 101a is unfolded to even a slight degree.

Figure 2:
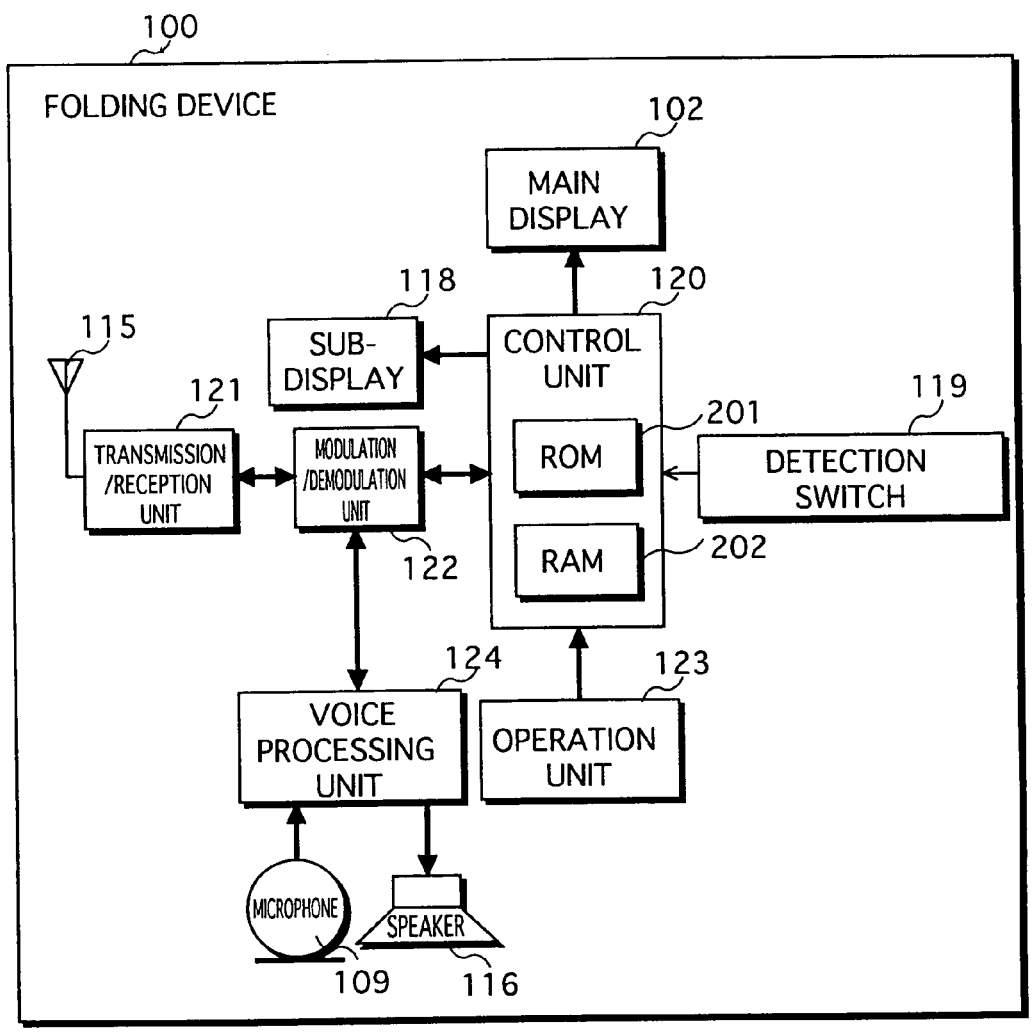
FIG. 2 is a function block drawing showing the structure of the present invention.

FIG. 2 is a function block drawing showing the structure of the communication device 100 of the present invention in detail.

The communication device 100 has the antenna 115, a transmission/reception unit 121, a modulation/demodulation unit 122, a voice processing unit 124, the microphone 109, the speaker 116, a control unit 120, the main display 102, the sub-display 118, a detection switch 119, and an operation unit 123.

Note that function units which are the same in FIG. 1 have the same numbering here, so an explanation of these will be omitted.

The transmission/reception unit 121 is a circuit composed of a filter, an amplifier and so on, and receives and transmits communication data wirelessly from/to external devices through the antenna 115.

The communication data is voice data including voice in conversations, and characters in e-mail and the like, and control data which is mainly used for communication control.

In addition, this control data includes management information which includes a caller's telephone number sent from the caller when initiating voice communication, and management information for e-mail transmitted according to an SMS bearer (short message bearer) system.

The modulation/demodulation unit 122 modulates data to be transmitted, and demodulates data which is received.

In addition, the modulation/demodulation unit 122, after extracting voice data from the demodulated data and outputting the voice data to the voice processing unit 124, outputs the above-described data, in other words the control data and the character data, to the control unit 120.

The control unit 120 is composed of a microprocessor and a ROM (read only memory) 201, a RAM (random access memory) 202 for storing data temporarily, and so on. The control unit 120 executes procedures such as making and receiving calls, establishment of calls, and so on, following a control program stored in the ROM 201.

A table 300 called a telephone directory is stored in the RAM 202.

The control unit 120 stores information input through the operation unit 123 (hereinafter "input information") in the RAM 202. Character information of e-mails and so on in the input information is outputted to the modulation/demodulation unit 122 as transmission data.

In addition, when there is incoming-communication such as a call, and e-mail from an external device, the control unit 120 notifies the user by, for instance, a beep.

The control unit 120 also executes procedures, according to instructions from the user, for obtaining the data of the incoming-calls, e-mail, and so on.

When the housing 101 is in a folded state, the control unit 120 obtains the present time from a clock circuit (not illustrated), and obtains the electric field strength from an RSSI (received signal strength indication) detector unit (not illustrated), and has the time, and an antenna pictograph corresponding to the electric field strength displayed on the sub-display 118 (hereinafter this display state is called the "stand-by screen").

The stand-by screen is the default state when the user does not perform any operation in particular, in other words, the stand-by state.

The processes explained above are the same as conventional processes.

In addition, the control unit 120 registers information such as a name, a telephone number, and a number in the table 300 for parties to which calls may be initiated, in other words, registered information. The control unit 120 also retrieves the registered information from the table 300.

Furthermore, when the scroll-down key 113a or the scroll-up key 113b is pressed continuously for a relatively long time while the housing 101 is in the folded state and the aforementioned stand-by screen is being displayed on the sub-display 118, the control unit 120 recognizes that the user has instructed display of the telephone directory. Then, the control unit 120 refers to the registered information that is stored in correspondence in the table 300 with the number "No. 001" and, when a name is included in the registered information, has the name displayed on the sub-display 118, and when a name is not included in the registered information, has the telephone number displayed on the sub-display 118.

When the scroll-down key 113a is pressed briefly at intervals after being pressed continuously while the stand-by screen is being displayed on the sub-display 118, the control unit 120 increments the number of the registered information which is displayed, each time the scroll-down key 113a is pressed briefly.

In other words, by briefly pressing the scroll-down key 113a repeatedly the number in the registered information that is displayed on the sub-display 118. Specifically, No. 001 is replaced with No. 002, No. 002 is replaced with No. 003, and so on.

Note that the maximum number of pieces of registered information that can be registered in the table 300 is set at 999. This number is the limit for the number of pieces of registered information. When pieces of information are registered the pieces are corresponded successively starting from a low value. Therefore, the maximum value of the corresponded numbers (hereinafter "maximum number") is equivalent to the number of pieces of information registered.

The control unit 120 is set so that the maximum number is incremented by 1 to "No. 001".

Furthermore, when the scroll-up key 113b is pressed briefly after the aforementioned continuous pressing, the control unit 120 decrements the registered information number by one with each brief press.

It should be noted however that the control unit 120 is set to decrement the registered information number "No. 001" to the aforementioned maximum number.

In other words, by briefly pressing the scroll-up key 113b repeatedly the number in the registered information that is displayed on the sub-display 118 is replaced, for example, No. 001 is replaced with No. 999, No. 999 is replaced with No. 998, and so on.

Note that when there is already registered information being displayed on the sub-display 118 and the scroll-down key 113a or the scroll-up key 113b is continuously pressed, the control unit 120 activates the same function as if a plurality of brief pushes have been performed repeatedly, and the number of repeats is substantially proportionate to the length time of the sustained press.

The control unit 120 has a function for, when a shut signal is input from the detection switch 119 while registered information is being displayed on the sub-display 118, initiating a call to the destination shown in the displayed registered information.

More specifically, when the registered information displayed on the sub-display 118 is a telephone number, the control unit initiates a call to the telephone number. When the registered information displayed on the sub-display 118 is a name, the control unit 118 transmits and initiates a call to the telephone number that is in correspondence with the name.

The operation unit 123 is made up of the flexible key 103, the 4-position key 104, the e-mail key 105, the menu/OK key 106, the end/power key 107, the numeric key pad 108 the web key 111, the side OK 112, the side scroll keys 113, and the start key 114.

The operation unit 123 outputs input information input using the keys to the control unit 120.

The voice processing unit 124 performs D/A conversion and so on of voice data received from the modulation/demodulation unit 122 and outputs the result to the speaker 116.

In addition, the voice processing unit 124 receives voice signals from the microphone 109, performs A/D conversion of the signals, and outputs the results to the modulation/demodulation unit 122.

<Data>

FIG. 3 shows the data structure of the table 300 that is a so-called telephone directory which is stored in the RAM 202, and in which names and telephone numbers are stored in correspondence.

A number column 301 shows numbers assigned to each piece of registered information. A name column 302 shows the names of the people registered in the telephone directory. A telephone number column 303 shows the telephone number of each person.

Each of the numbers is a three figure number which corresponds to the order in which the information is registered. Rows in the table 300 which do not have any registered information show "000".

Furthermore, rows in which there is registered information show a value from "001" through to "999".

<Operation>

The following explains the operation of the folding mobile communication device 100.

Figure 4:
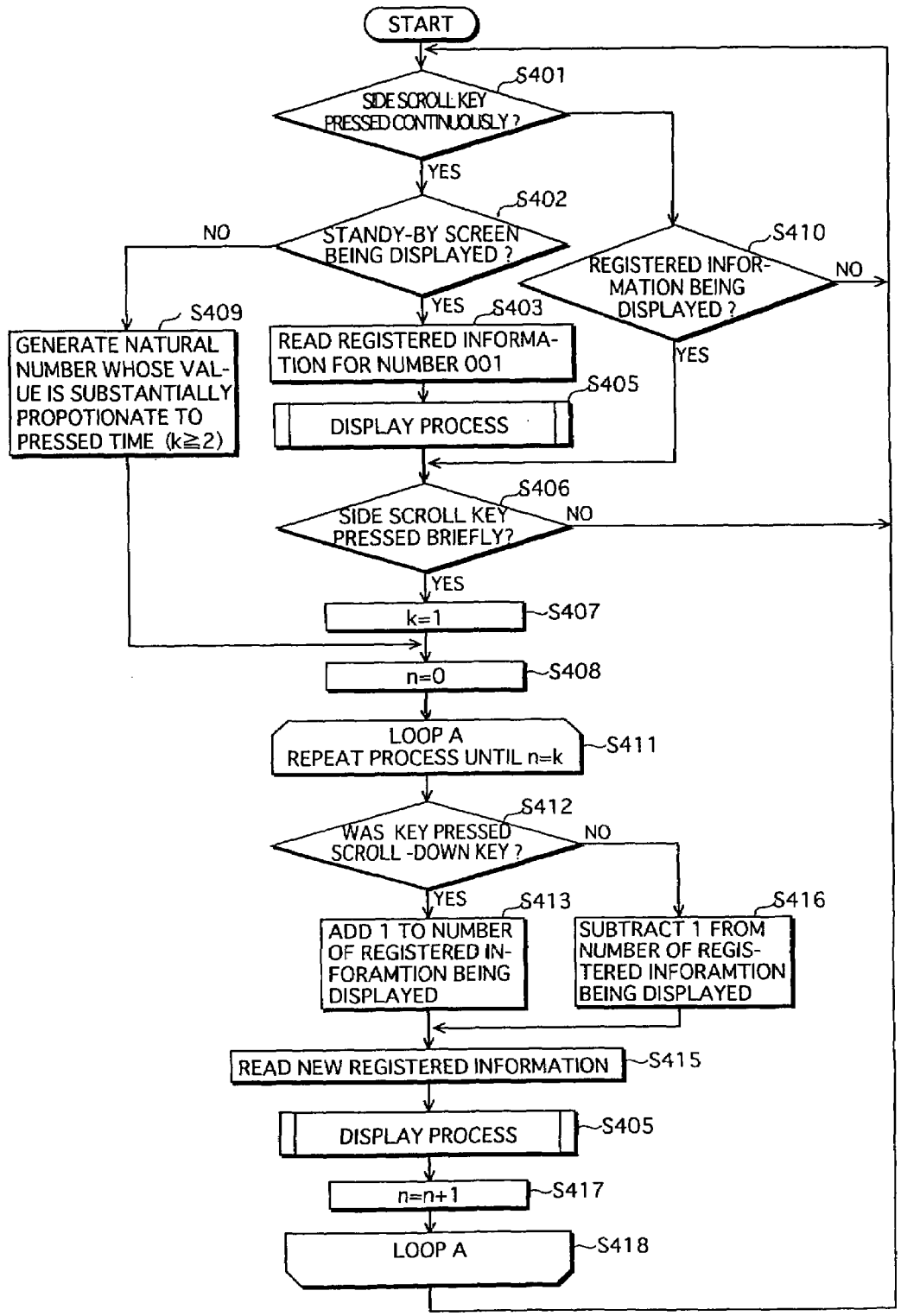
FIG. 4 is a flowchart showing a process by the control unit to have the telephone directory displayed on the sub-display.

FIG. 4 is a flowchart showing the process by the control unit 120 for displaying the telephone directory on the sub-display 118.

The control unit 120 judges whether either of the side scroll keys 113 has been continuously pressed (step S401). When either of the side scroll keys 113 has been continuously pressed, the control unit 120 further judges whether the stand-by screen is being displayed on the sub-display 118 (step S402).

When the stand-by screen is being displayed, the control unit 120 retrieves the registered information registered in the table 300 for the number 001 (step S403), and executes a process for having the registered information displayed (hereinafter "display process") (step S405). Then the control unit 120 judges whether either of the side scroll keys 113 has been briefly pressed (step S406). When either of the side scroll keys has been briefly pressed, the control unit 120 makes the value of a variable k "1" (step S407), and the value of a variable n "0" (step S408).

Furthermore, when the control unit 120 judges at step S402 that the stand-by screen is not being displayed on the sub-display 118, it generates a natural number k(k≧2) which is substantially proportionate to the time that the continuous pressing was performed (step S409), and makes the value of the variable n "0" (step S408).

When either of the side scroll keys 113 is judged at step S401 to have been continuously pressed, the control unit 120 judges whether registered information is being displayed on the sub-display 118 (step S410), and when registered information is being displayed, judges whether either of the side scroll keys 113 is being briefly pressed (step S406). When either of the side scroll keys 113 is being briefly pressed, the control unit 120 makes the value of the variable k "1", (step S407), and makes the value of the variable n "0" (step S408).

Meanwhile, when the control unit judges at step S410 that registered information is not being displayed, it returns to the first step S401 where it judges whether either of the side scroll keys 113 is being continuously pressed.

When the control unit 120 judges at step S406 that neither of the side scroll keys 113 is being briefly pressed, it returns to the first step S401 where it judges whether either of the side scroll keys is being continuously pressed.

Next, the control unit 120 repeats the following process (steps S411 to step S418) until the variables n and k have the same value.

In other words, the control unit 120 judges whether the pressed key is the scroll-down key 113a (step 412), and when the judgement is affirmative, refers to the number included in the displayed registered information, and calculates a value which is the number incremented by 1 (step S413).

Next, the control unit 120 retrieves the registration information in which this calculated value is included (step S415), executes the display process to have the registered information displayed (step S405), and adds 1 to the value of n to make a new value of n (step S417).

Furthermore, when the control unit 120 judges at step S412 that the pressed key is not the scroll-down key 113a, in other words that the pressed key is the scroll-up key 113b, the control unit 120 refers to the number included in the registered information being displayed and calculates a value which is 1 decremented from the number (step S416). The control unit 120 retrieves the registered information which includes the number which is the calculated value (step S415), executes the display process to have the registered information displayed (step S405), and adds 1 to the value of n to make a new value of n (step S417).

On completing the above-described step S411 to step S418, the control unit 120 returns to the first step S401 where it judges whether either of the side scroll keys 113 is being continuously pressed.

Figure 5:
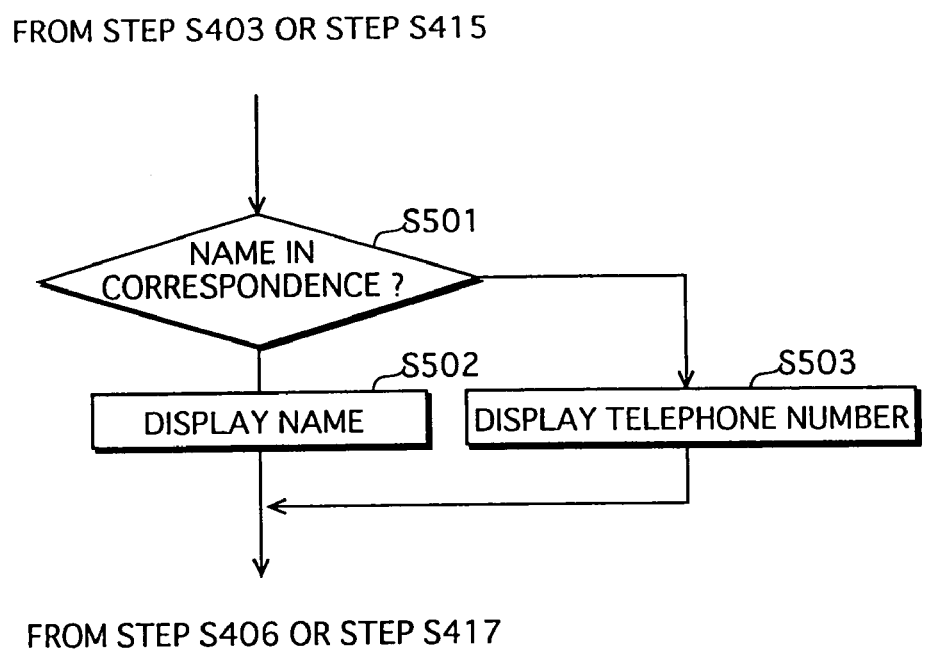
FIG. 5 is a flowchart showing the process at step S405 in FIG. 4 which displays the registered information.

FIG. 5 is a flowchart showing in detail the process at step S405 in FIG. 4 to have the registered information displayed.

The control unit 120 judges whether a name is in correspondence with the registered information retrieved from the table 300 (step S501), and when the judgement is affirmative, has the name displayed on the sub-display 118.

On the other hand, when the judgement is negative, the control unit 120 has the telephone number displayed.

Figure 6:
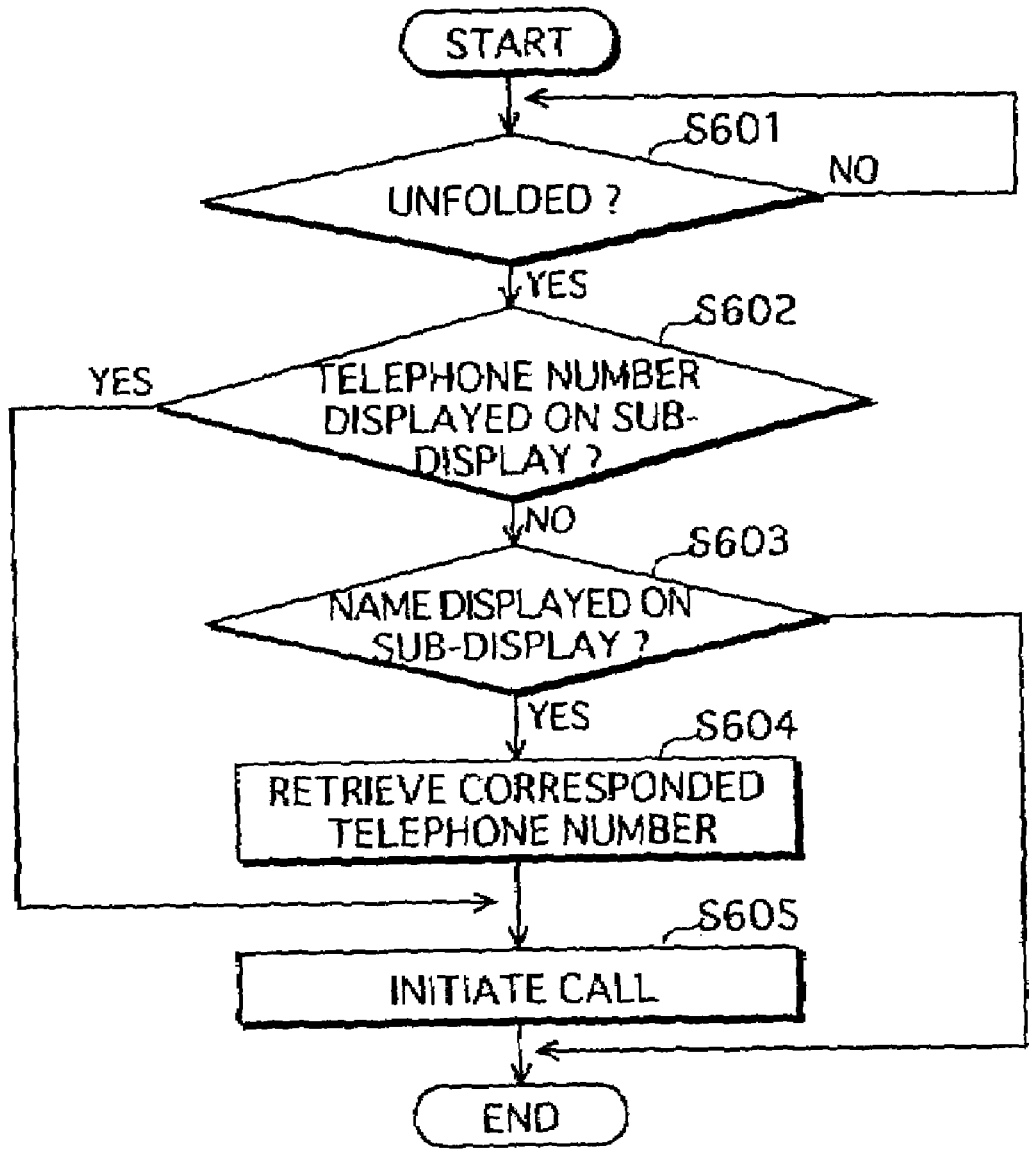
FIG. 6 is a flowchart showing a process by the control unit for initiating a call.

FIG. 6 is a flowchart showing a process by the control unit 120 for initiating a call.

The control unit 120 judges whether a signal is being input from the detection switch 119 (step S601) and waits until such a signal is input. When such a signal is input, the control unit 120 judges whether a telephone number is being displayed on the sub-display 118 as registered information (step S602). When a telephone number is not being displayed, the control means 120 judges whether a name is being displayed on the sub-display 118 as registered information (step S603). When a name is being displayed on the sub-display 118, the control unit 120 searches the table 300 for the telephone number which corresponds to the name (step S604), and transmits the telephone number to initiate a call to the number (step S605).

In addition, when the control unit 120 judges at step S603 that a name is not being displayed on the sub-display 118, it ends the process.

Meanwhile, when the control unit 120 judges at step S602 that a name is not being displayed, it transmits the telephone number to initiate a call to the telephone number (step S605), and ends the process.

<Display>

The following explains the display content of the sub-display 118.

Figure 7:
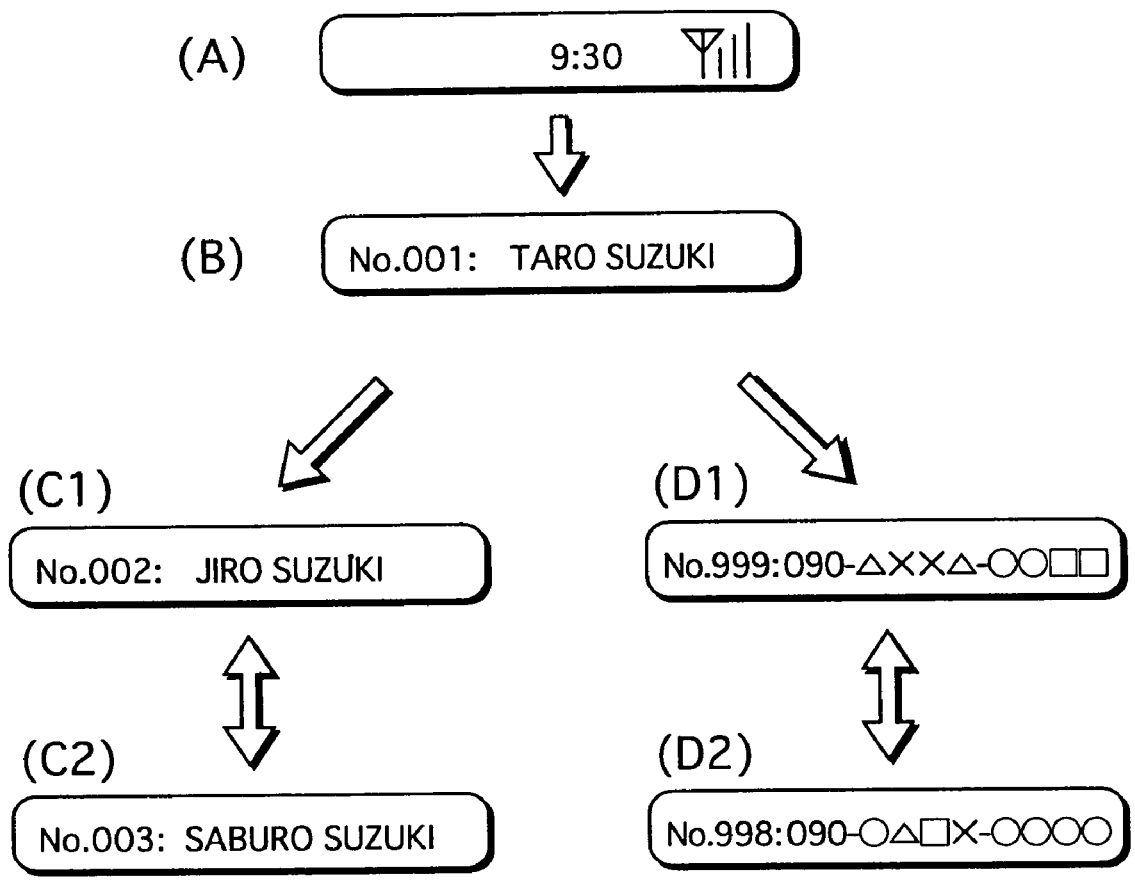
FIG. 7 shows changes in the display state of the sub-display when the housing is in a folded state.

FIG. 7 shows how the display state of the sub-display 118 changes when the housing 101 is in the folded state.

FIG. 7(A) is the default display screen on the sub-display 118 when in stand-by. The present time "9:30" and a pictograph representing the electric field intensity are displayed by the control unit 120.

Note that the control unit 120 may also have a plurality of icons and characters displayed in the unused area to the left of the time to show the amount of battery power remaining, settings of the communication device, that e-mail has been received, and so on.

FIG. 7(B), FIG. 7(C1), FIG. 7(C2), FIG. 7(D1), and FIG. 7(D2) are display screens on the sub-display 118 in stand-by, and show display states when the telephone directory is activated.

FIG. 7(B) shows the display content when the telephone directory, in other words the registered information, is displayed on the sub-screen 118 when the scroll-down key 113a or the scroll-up key 113b is continuously pressed while the display state is that in FIG. 7(A).

In other words, FIG. 7(B) is the display state when step S405 in FIG. 4 is executed after step S403, and shows the display content of the registered information which is in correspondence with the number "No. 001".

In this case a name is registered in the registered information which corresponds to the number "No. 001". Therefore, the control unit 120 has the name "Taro Suzuki" displayed rather than the telephone number, since the name makes it easier for the user to recognize to whom the registered information refers.

In other words, FIG. 7(B) is the display state when step S502 in FIG. 5 is executed.

FIG. 7(C1) shows the display content of the registered information on the sub-screen 118 when the scroll-down key 113a is pressed briefly while the display state is that in FIG. 7(B).

In other words, FIG. 7(C1) is the display state when step S405 in FIG. 4 is executed after Step S413 and step S415, and shows the display content of the registered information which is in correspondence with the number "No. 002".

In the same was as the registered information for the number "No. 001", a name is registered in the registered information for the number "No. 002". Therefore, the control unit 120 has that name "Jiro Suzuki" displayed rather than the telephone number, since the name makes it easier for the user to recognize to whom the registered information refers.

Furthermore, FIG. 7(C2) shows the display content of the registered information on the sub-screen 118 when the scroll-down key 113a is pressed briefly while the display state is that in FIG. 7(C1).

In other words, FIG. 7(C2) is the display state when step S405 in FIG. 4 is executed after Step S413 and step S415, and shows the display content of the registered information which is in correspondence with the number "No. 003".

In the same way as the registered information for the numbers "No. 001" and "No, 002", a name is registered in the registered information for the number "No. 003". Therefore, the control unit 120 has that name "Saburo Suzuki" displayed instead of the telephone number, since the name makes it easier for the user to recognize to whom the registered information refers.

FIG. 7(D1) shows the display content of the registered information on the sub-screen 118 when the scroll-up key 113b is pressed briefly while the display state is that in FIG. 7(B).

In other words, FIG. 7(D1) is the display state when step S405 in FIG. 4 is executed after step S416 and step S415, and shows the display content of the registered information which is in correspondence with the number "No. 999".

In this case there is no name in the registered information that is in correspondence with the number "No. 999". Therefore the control unit 120 has the telephone number "090-ΔXXΔ-○○□□" displayed.

In other words, FIG. 7(D1) is the display state when step S503 in FIG. 5 is executed.

FIG. 7(D2) shows the display content of the registered information on the sub-screen 118 when the scroll-up key 113b is pressed briefly while the display state is that in FIG. 7(D1).

In other words, FIG. 7(D2) is the display state when step S405 in FIG. 4 is executed after step S416 and step S415, and shows the display content of the registered information which is in correspondence with the number "No. 998".

In this case, in the same way as in the number "No. 999", there is no name registered in the registered information which corresponds to the number "No. 998". Therefore, the control unit 120 has the telephone number "090-○Δ□X-○○○○" displayed.

In other words, FIG. 7(D2) is the display state when step S503 in FIG. 5 is executed.

Note that when the scroll-down key 113a or the scroll-up key 113b is continuously pressed while the display state is that in FIG. 7(B), the telephone directory can be searched at high speed.

In other words, this is the state when step S411 through to step S418 in FIG. 4 are executed repeatedly after step S409.

As described above, when the user puts the housing into the unfolded state from the folded state when the display state is any of FIG. 7(B), FIG. 7(C1), FIG. 7(C2), FIG. 7(D1) and FIG. 7(D2), the shut signal ceases being input from the detection switch 119, and the control unit 120 initiates a call by transmitting the telephone number in the registered information which is displayed on the sub-display 118. As a result it is possible to call the person specified by the registered information.

As has been explained, according to the present embodiment, when the housing 101 is unfolded while registration information is being displayed on the sub-display 118, a call is initiated to the person specified by the displayed registration information, meaning that cumbersome operations are unnecessary to initiate a call.

Note that the present embodiment is an example of a so-called folding mobile communication device which folds and unfolds as used, but the present invention also applies to an open/close-type mobile communication device which opens and closes according to a lid pivoting on a hinge attached to the housing, or according to a lid which attached to the housing which slides.

In such a case, the sub-display 118 is provided in a position so as to be exposed when the lid is closed.

Furthermore, an example of the detection switch 119 being a micro switch that detects mechanically whether the communication device 100 is in an unfolded state or a folded state is used in the present embodiment, but an optical sensor which detects that the housing 101 has been put into the unfolded state, an encoder that detects the degree at which the housing 101 is unfolded, or the like, maybe used.

Furthermore, in the present embodiment the main display 102 is made up of a color LCD and so on, but the main display 102 is not limited to this and may be an organic EL (electroluminescent) display or the like.

Furthermore, in the present embodiment the control unit 120 corresponds information in the table 300 successively from the a lowest value number, but names may be registered in order of the alphabet or the like of the country in which the communication device 100 is being used, for example in order of the Japanese syllabary in Japan, or in order of the English alphabet in the United States.

In such a case, the control unit 120 re-corresponds numbers to each piece of registration information every time a new piece is registered.

Furthermore, the control unit 120 may correspond the telephone number in each piece of registered information with the number of times the telephone number has been called, and update the table 300 each time a call is made so that the more times a telephone number has been called, the lower the value of the number with which it is corresponded.

As a result, the names and telephone numbers of parties who are called most frequently are displayed preferentially on the sub-display 118.

Furthermore, in the present embodiment the control unit 120 has the registered information that has been registered in the telephone directory displayed, but the control unit 120 may have telephone numbers that have been obtained from recent incoming-calls (in other words telephone numbers sent according to a caller ID service) displayed.

In such a case, since a telephone number is obtained even if the ringer stops without the call being answered, the caller whose call was missed can be called back easily by unfolding the housing 101.

Furthermore, the control unit 120 may store the telephone number obtained from the incoming-call in the table 300, and correspond numbers by giving the lowest value number to a latest caller.

In such a case, telephone numbers of incoming-calls are displayed on the sub-display 118 with priority given in order starting from the call that was received latest.

Furthermore, when a name or a telephone number is being displayed on the sub-display 118, the control unit 120 may have the same display content displayed on the main display 102 when the housing 101 is subsequently unfolded.

Furthermore, when a name is being displayed on the sub-display 118, the control unit 120 may have the name and the corresponding telephone number displayed on the main display 102 when the housing 101 is subsequently unfolded.

Figure 8:
FIG. 8 shows a display state of the main display when the housing is unfolded.

FIG. 8 shows the display state of the sub-display 118 and the main display 102 in such a case.

FIG. 8(A) shows the name "Taro Yamada" being displayed on the sub-display 118 by the control unit 120 while the housing 101 is in the folded state.

FIG. 8(B) shows the name "Taro Yamada" and the telephone number "090-☐X◯X-◯XX◯" which corresponds to the name being displayed by the control means 120 on the sub-display 120, when the housing 101 has been unfolded.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A folding mobile communication device, comprising:
   a folding housing member;
   storage unit, in the folding housing member enabled, to store pieces of call-destination information, each piece of call-destination information specifying a possible destination of a telephone call;
   first display unit for displaying one piece of call-destination information to a user in a position exterior of the folding housing member for viewing by a user when the folding housing member is in a folded state;
   a second display unit for displaying information to a user only when the folding housing member is in an operative unfolded state;
   a control unit for automatically prioritizing the sequence of displaying call-destination information in accordance with predetermined parameters and providing a first display unit with the priority one-piece of call-destination information;
   a switch member for detecting movement of the folding housing member from a folded state to an unfolded state; and
   a call initiation unit for automatically initiating, upon receipt of a signal from the switch member, a telephone call to the destination specified by the piece of call-destination information being currently displayed on the first display unit.

2. The folding mobile communication device of claim 1, wherein
   each of the pieces of call-destination information is one of (a) a telephone number, and (b) a name of a party that corresponds to a telephone number, and
   when the folding housing member is in the folded state, the first display unit, when the displayed piece of call-destination information is a name of a party, displays the telephone number corresponding to the name of the party on the first display unit and when the displayed piece of call-destination information is a telephone number number, displays the telephone number on the first display unit.

3. The folding mobile communication device of claim 2 wherein the control unit includes a telephone number obtaining unit for obtaining a telephone number which is transmitted together with an incoming-call, and storing the obtained telephone number in the storage unit.

4. The folding mobile communication device of claim 3 wherein the control unit further includes an incoming-call time corresponding unit for corresponding a time of reception of the incoming-call with the obtained telephone number,
   wherein the first display unit displays the displayed call-destination information in a priority of the most recently obtained telephone number.

5. The folding mobile communication device of claim 4 wherein the control unit further includes a call amount correspondence unit for corresponding, for each destination, an amount of times that a telephone call has been initiated to the destination based on a corresponding piece of call-destination information, with the corresponding piece of call-destination information in the storage unit;
   wherein the first display unit replaces so that telephone numbers are displayed with priority given in descending order of the amount of times that a telephone call has been made to the corresponding call destination.

* * * * *